(12) United States Patent
Kissee

(10) Patent No.: US 10,694,730 B2
(45) Date of Patent: Jun. 30, 2020

(54) LEADER LINE SPOOLING DEVICE

(71) Applicant: Steve Kissee, Harahan, LA (US)

(72) Inventor: Steve Kissee, Harahan, LA (US)

( * ) Notice: Subject to any disclaimer, the term of this patent is extended or adjusted under 35 U.S.C. 154(b) by 428 days.

(21) Appl. No.: 15/839,170

(22) Filed: Dec. 12, 2017

(65) Prior Publication Data
US 2018/0160667 A1 Jun. 14, 2018

Related U.S. Application Data

(60) Provisional application No. 62/433,033, filed on Dec. 12, 2016.

(51) Int. Cl.
*A01K 91/06* (2006.01)
*A01K 93/00* (2006.01)

(52) U.S. Cl.
CPC .............. *A01K 91/06* (2013.01); *A01K 93/00* (2013.01)

(58) Field of Classification Search
CPC ........ A01K 91/04; A01K 91/06; A01K 93/00; A01K 95/00
See application file for complete search history.

(56) References Cited

U.S. PATENT DOCUMENTS

| | | | | |
|---|---|---|---|---|
| 829,608 A | * | 8/1906 | Stanton | A01K 93/00 43/43.1 |
| 2,728,161 A | * | 12/1955 | Mangel | A01K 93/00 43/43.11 |
| 2,731,756 A | * | 1/1956 | Nelson | A01K 91/06 242/309 |
| 2,779,122 A | * | 1/1957 | De Groff | A01K 93/00 43/44.9 |
| 2,867,936 A | * | 1/1959 | Lambach | A01K 93/00 43/44.95 |
| 2,888,773 A | * | 6/1959 | Hudkins | A01K 93/00 43/43.11 |
| 2,904,923 A | * | 9/1959 | Conyers | A01K 93/00 43/43.11 |
| 3,106,797 A | * | 10/1963 | Hancock | A01K 93/00 43/43.11 |
| 4,571,878 A | * | 2/1986 | Nyman | A01K 93/00 43/43.11 |
| 4,574,515 A | * | 3/1986 | Garner | A01K 93/00 43/43.11 |

(Continued)

FOREIGN PATENT DOCUMENTS

FR 1036232 A * 9/1953 ............. A01K 93/00

*Primary Examiner* — Magdalena Topolski

(57) ABSTRACT

The leader line spooling device that allows the length of a leader line to be adjusted while accommodating a variety of fishing line accessories such as ornaments, fishing bobbers, and weights. The apparatus includes a flexible wire, a cap, a spool, an eyelet hook, and a fishing line hole. The flexible wire contains the variety of fishing line accessories while allowing the fishing line accessories to slide and increase the chances of visually attracting nearby fish. The cap connects the flexible wire to the spool. The spool contains extra additional leader line that may or may not be used. The eyelet hook contains and secures leader line that is most likely going to be used. The fishing line hole allows the leader line to be connected to the spool. The apparatus preferably includes a notch that secures the leader line to the eyelet hook.

19 Claims, 7 Drawing Sheets

(56) References Cited

U.S. PATENT DOCUMENTS

| | | | | |
|---|---|---|---|---|
| 5,253,445 | A * | 10/1993 | Spoonemore | A01K 93/00 43/17 |
| 5,265,369 | A * | 11/1993 | Botkins | A01K 93/02 43/43.11 |
| 6,763,629 | B1 * | 7/2004 | Bennett | A01K 91/10 43/15 |
| 7,261,327 | B1 * | 8/2007 | Johnston | A01K 91/04 289/17 |
| 7,685,684 | B1 * | 3/2010 | James | A01K 91/04 24/129 A |
| 8,646,202 | B1 * | 2/2014 | Buhler | A01K 91/04 43/4.5 |
| 2006/0288633 | A1 * | 12/2006 | Fiferlick | A01K 93/00 43/44.92 |
| 2014/0250761 | A1 * | 9/2014 | Preller, Jr. | A01K 97/12 43/17 |
| 2018/0360014 | A1 * | 12/2018 | Bennis | A01K 93/02 |
| 2019/0216071 | A1 * | 7/2019 | Bennis | A01K 91/03 |
| 2019/0320635 | A1 * | 10/2019 | Stagat | A01K 91/14 |
| 2020/0015467 | A1 * | 1/2020 | Wehrenberg | A01K 89/081 |

* cited by examiner

US 10,694,730 B2

LEADER LINE SPOOLING DEVICE

The current application claims priority to U.S. provisional application Ser. No. 62/433,033 filed on Dec. 12, 2016.

FIELD OF THE INVENTION

The present invention generally relates to fishing line accessory. More specifically, the present invention is a leader line spooling device.

BACKGROUND OF THE INVENTION

There are many types of fishing corks on the market today. Wired corks are fishing corks with a wire running through the middle. The cork floats up and down the wire when it is "popped" or pulled by the fisherman. This popping or pulling creates sounds and splashes that attract fish. On the top end of the wire the fishing line is tied which goes towards the rod and reel. On the bottom end of the wire the leader line is tied which goes down to the fishing hook.

There is a major problem with standard wired fishing corks. The problem being the inability to change the depth of the leader line without having to cut and retie a new leader line to the desired depth. Sometimes a five-foot leader line is needed because fish are holding in deeper water. At other times a two-foot leader is needed because the fish are holding in shallow waters. Conditions change a lot during a fishing day and successful fisherman need to be able to respond rapidly by changing depths quickly when required.

It is therefore an objective of the present invention to provide a line spooling device which allows users to easily adjust the depth of the leader line. The leader line spooling device works by winding the desired amount of leader line onto the spool, then into the holding eyelet hook. Up to ten feet of leader line can be spooled. So, when fishing, if it is desired to lengthen the leader line, the user simply unwinds the line from the eyelet hook then pulls off the desired length from the spool then rewinds back into the holding eyelet. Vice versa if it is desired to shorten the leader line.

DETAIL DESCRIPTIONS OF THE INVENTION

All illustrations of the drawings are for the purpose of describing selected versions of the present invention and are not intended to limit the scope of the present invention.

Figure 1:
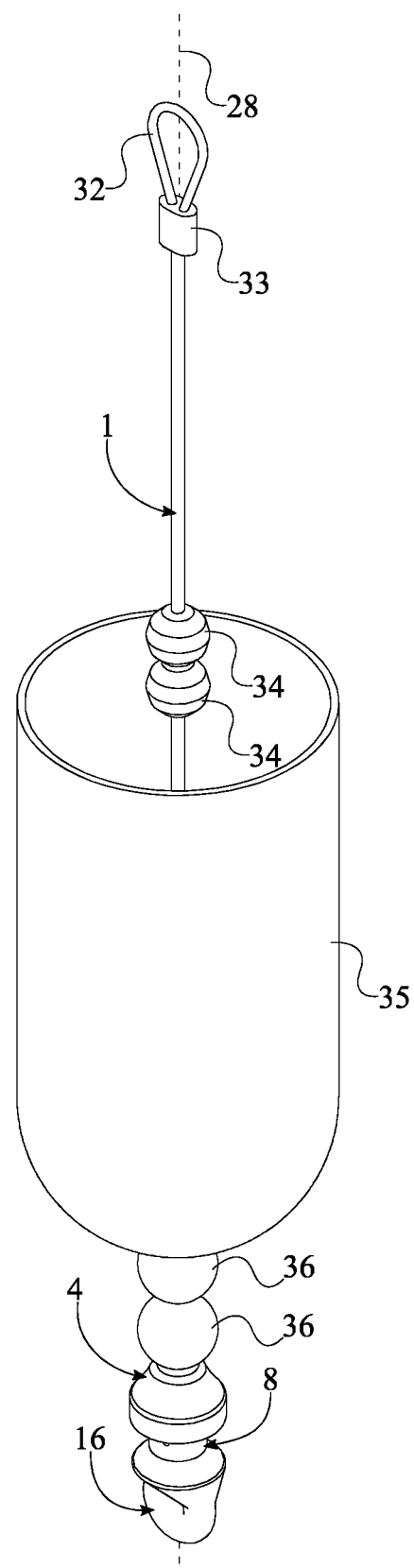
FIG. 1 is a top perspective view of the preferred embodiment of the present invention with at least one ornament, a fishing bobber, and at least one weight.
Figure 2:
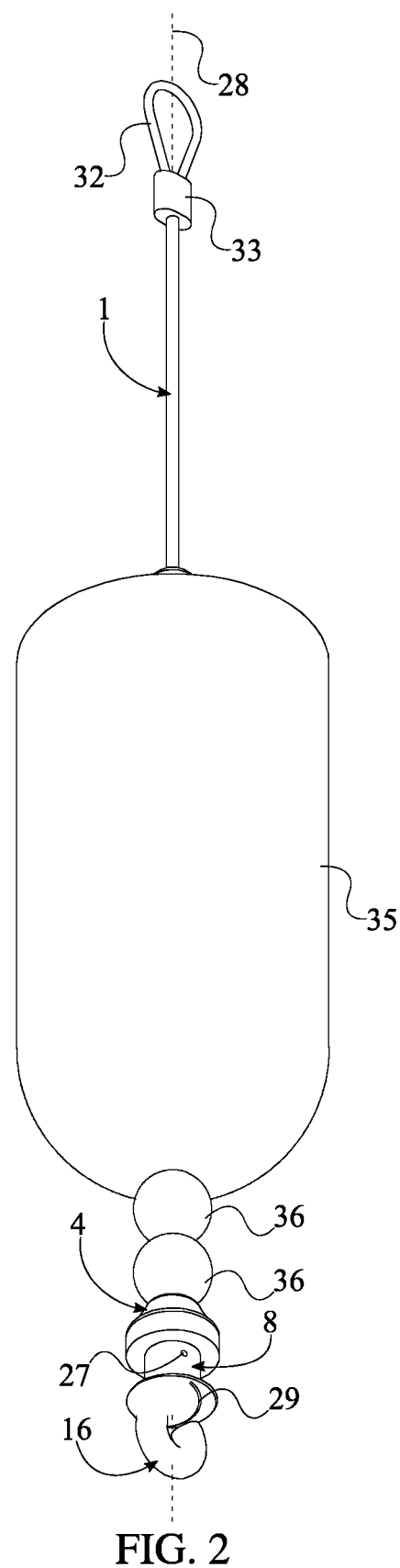
FIG. 2 is a bottom perspective view of the preferred embodiment of the present invention with at least one ornament, a fishing bobber, and at least one weight.
Figure 3:
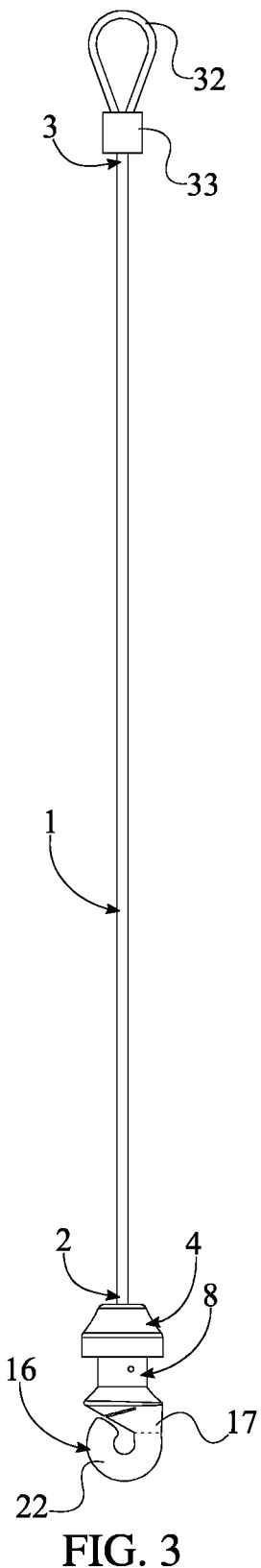
FIG. 3 is a front side view of the preferred embodiment of the present invention.
Figure 4:
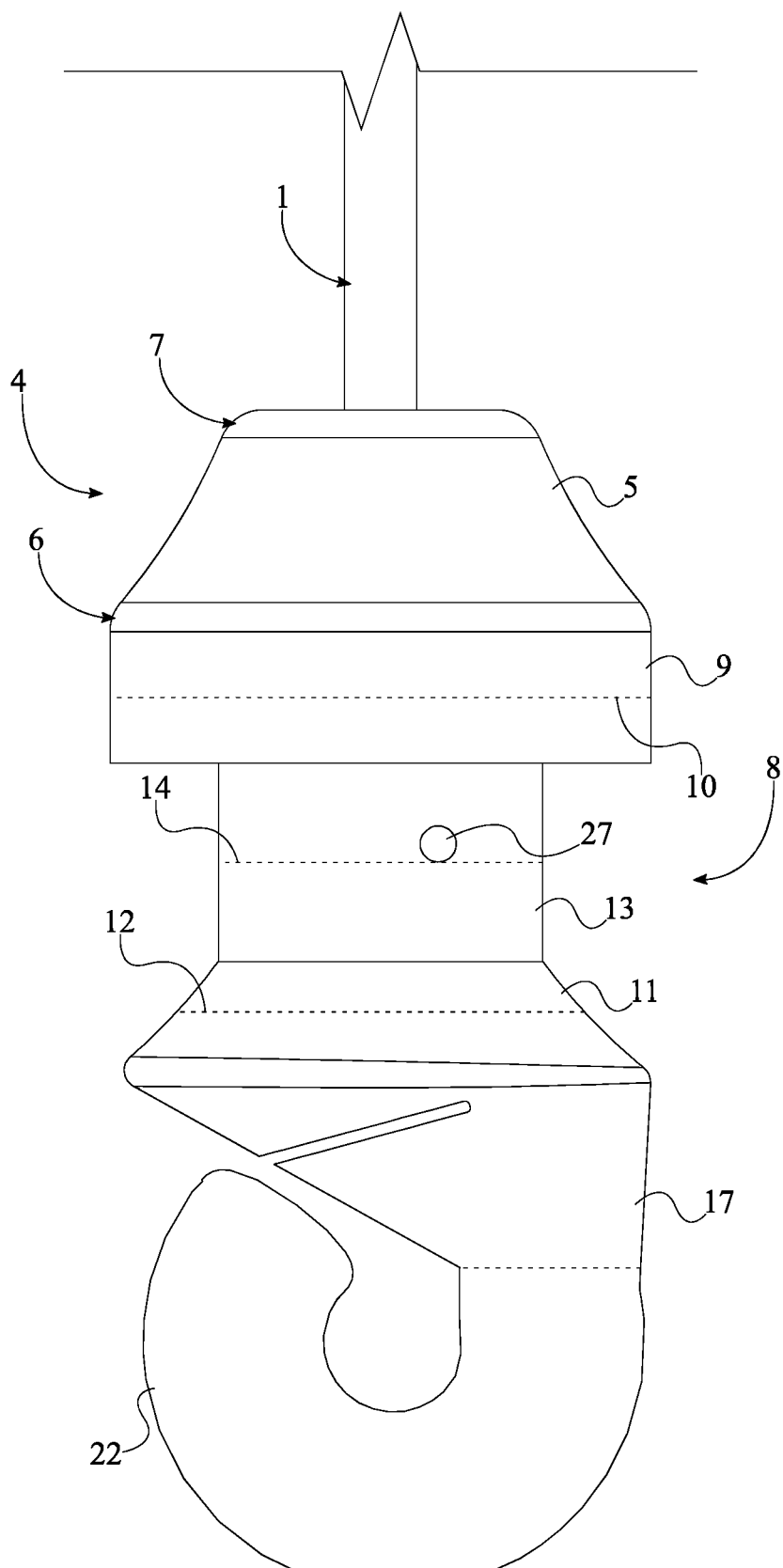
FIG. 4 is an exploded view of the preferred embodiment of the present invention with a diameter of a first stop and a diameter of a second stop being larger than a diameter of a cylindrical body.
Figure 5:
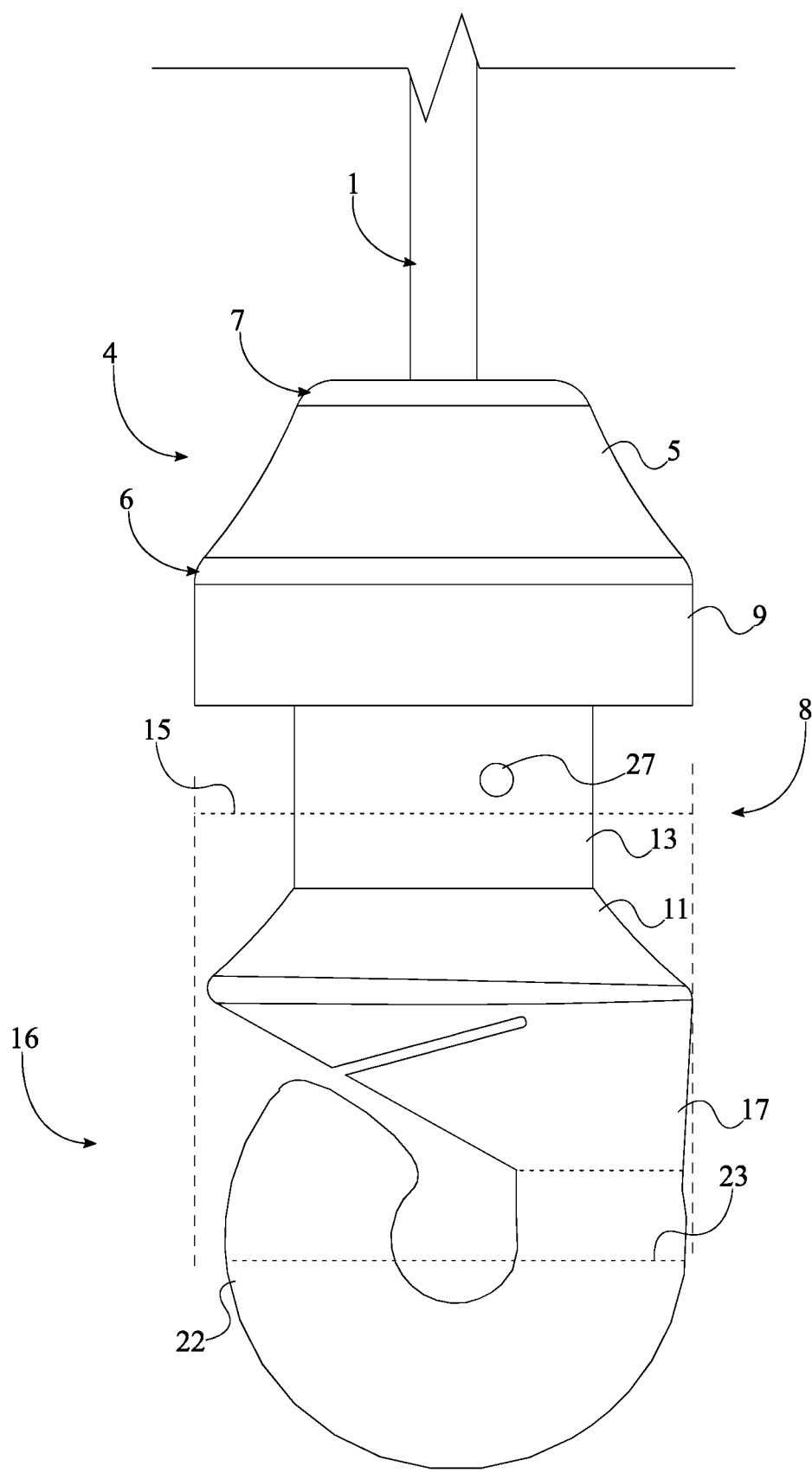
FIG. 5 is a front side view of the preferred embodiment of the present invention with a diameter of a hook being smaller than a diameter of a spool.

The present invention is a leader line spooling device that allows the length of a leader line to be adjustable. More specifically, the present invention allows for an adjustable leader line length while having a wire and a variety of fishing accessories attached to the leader line. In order for the leader line length to be adjustable, the present invention comprises a flexible wire 1, a cap 4, a spool 8, an eyelet hook 16, and a fishing line hole 27, as seen in FIG. 1, FIG. 2, and FIG. 3. The flexible wire 1 connects a variety of fishing line accessories such as beads, corks, and weights to a leader line. The cap 4 connects the spool 8 and eyelet hook 16 to the flexible wire 1. The spool 8 secures a leader line to the present invention and a user may wrap and unravel the leader line in an organized fashion about the spool 8. The spool 8 stores a portion of the leader line that is most likely not going to be used. More specifically, the portion of the leader line that is wrapped around the spool 8 serves as a reserve. The eyelet hook 16 fixes a of a portion of the leader line that is being used. The portion of the leader line that is going to be used extends from the eyelet hook 16 to a free end of the leader line. The overall length of the portion of the leader line that is going to be used is fixed with the wrapping and unraveling of the leader line around the eyelet hook 16. The portion of the leader line that is going to be used serves as the main supply for the leader line. The overall length is lengthened with the unraveling of the main supply about the eyelet hook 16 and is shortened with the wrapping of the main supply about the eyelet hook 16. In order to secure the overall length of the portion of the leader line, the eyelet hook 16 comprises an arm 17 and a hook 22. The arm 17 stores the main supply. The hook 22 prevents the main supply from unraveling from the arm 17 without the leader line being knotted or tied. The fishing line hole 27 allows the leader line to be attached to the spool 8.

In order for the present invention to accommodate varying lengths of the leader line and accommodate a variety of fishing line accessories, as illustrated in FIG. 3, the cap 4 is terminally connected to the flexible wire 1. The cap 4 therefore serves as a stopper while allowing any attached fishing line accessories to continuously traverse along the flexible wire 1. The spool 8 is connected adjacent to the cap 4, opposite the flexible wire 1 thereby allowing the main supply to be unraveled and wrapped and the overall length of the leader line to be easily lengthened and shortened, respectively. The present invention moves easily through water as the spool 8 is aligned with the cap 4 along a central axis 28, providing a streamline structure. The arm 17 is connected adjacent to the spool 8, opposite the cap 4 thereby delineating the reserve from the main supply and as well as providing a continuous path from the reserve to the main supply. In order to fix the overall length of the leader line and to prevent the main supply from unraveling from the spool 8, the hook 22 is connected adjacent to the arm 17, opposite the spool 8. The leader line is securely attached to the spool 8 as the fishing line hole 27 laterally traverses through the spool 8.

The leader line is effectively stored on the spool 8 while accommodating length adjustability as the spool 8 comprises a first stop 9, a second stop 11, and a cylindrical body 13, shown in FIG. 4, FIG. 5, FIG. 6, and FIG. 7. The first stop 9 and the second stop 11 prevent the reserve which is wrapped around the cylindrical body 13 from slipping past the cylindrical body 13. The cylindrical body 13 allows reserve to be stored on the present invention. The first stop 9 is terminally fixed to the cylindrical body 13, and the second stop 11 is terminally fixed to the cylindrical body 13, opposite the first stop 9. This arrangement effectively encloses the reserve around the cylindrical body 13. The reserve is secured to the spool 8 via the fishing line hole 27 as the user loops the leader line through the fishing line hole 27 and knots the leader line. The first stop 9, the second stop 11, and the cylindrical body 13 are aligned with the central axis 28 so that the reserve does not unravel from the cylindrical body 13 and the streamline structure of the present invention is preserved. More specifically, a diameter 10 of the first stop 9 is larger than a diameter 14 of the cylindrical body 13. Similarly, a diameter 12 of the second stop 11 is larger than the diameter 14 of the cylindrical body 13. In the preferred embodiment of the present invention, the first stop 9 is positioned adjacent to the cap 4, and the second stop 11 is positioned adjacent to the arm 17.

The cap 4 defines a streamline structure for the present invention as the cap 4 comprises a main body 5, a first end 6, and a second end 7, also seen in FIG. 4, FIG. 5, FIG. 6, and FIG. 7. The main body 5 mounts the flexible wire 1 to the spool 8. The flexible wire 1 is preferably fixed to the main body 5, however in alternate embodiments of the present invention, the flexible wire 1 may be interchanged. The main body 5 facilitates the continuous and fluid movement of the present invention throughout water as the main body 5 tapers from the first end 6 to the second end 7. In the preferred embodiment of the present invention, the first end 6 is positioned adjacent the spool 8. The streamline structure is further preserved as the arm 17 is angularly aligned with the central axis 28 and a diameter 23 of the hook 22 is smaller than a diameter 15 of the spool 8. This arrangement prevents the hook 22 from being a source of resistance as the present invention traverses through water.

Figure 6:
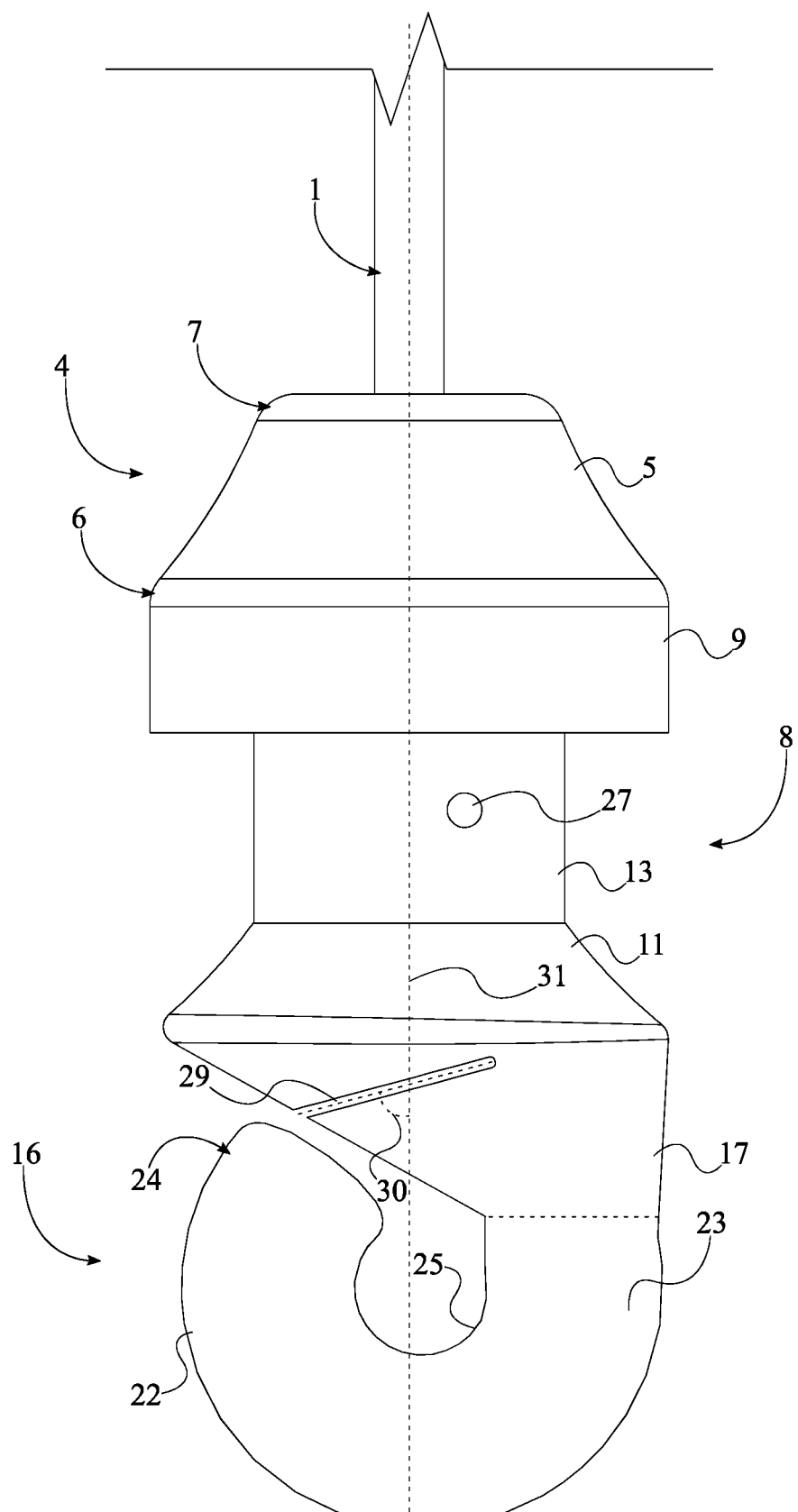
FIG. 6 is a front side view of the preferred embodiment of the present invention with a notch being oriented at an acute angle with a sagittal plane.

In order to prevent the reserve and the main supply from slipping to the arm 17 and the spool 8, respectively, the present invention further comprises a notch 29, shown in FIG. 6. The notch 29 delineates the reserve from the main supply along the leader line. The notch 29 laterally traverses into the arm 17, along a concave surface 25 of the eyelet hook 16. A sagittal plane 31 bilaterally traverses through the spool 8 and the eyelet of the hook 22. In the preferred embodiment of the present invention the notch 29 is oriented at an acute angle 30 with the sagittal plane 31 of the spool 8. This arrangement allows the leader line to be secured between the spool 8 and the arm 17 without having to knot or tie the leader line. In the preferred embodiment of the present invention, the notch 29 is positioned adjacent a free end 24 of the hook 22 facilitating the wrapping and unraveling of the leader line about the eyelet hook 16.

Figure 7:
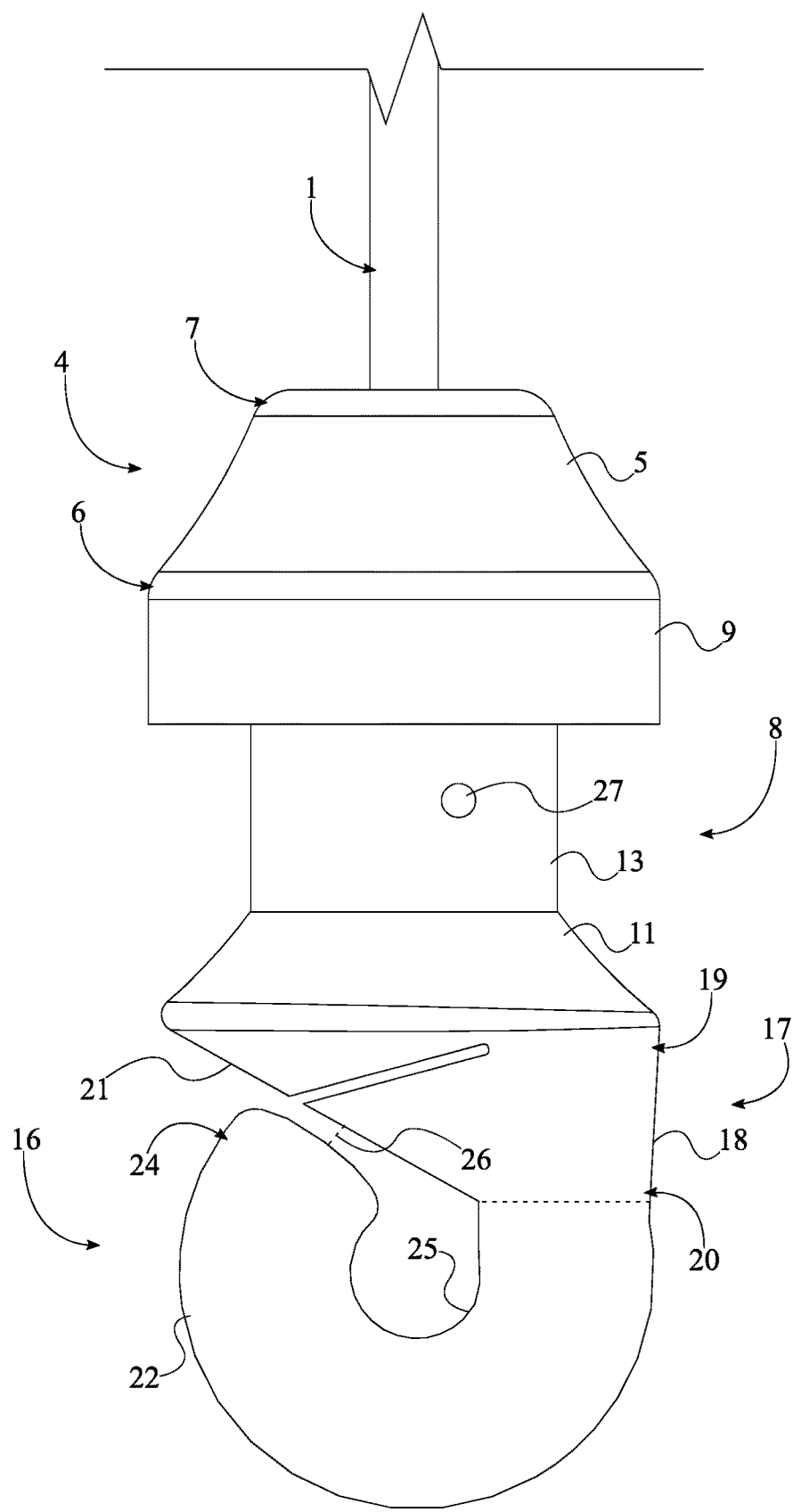
FIG. 7 is a front side view of the preferred embodiment of the present invention with a free end of a hook being positioned offset from a lateral portion of a truncated body by a narrow gap.

The reserve and the main supply are further delineated as the arm 17 comprises a truncated body 18, shown in FIG. 7. A wide end 19 of the truncated body 18 is positioned adjacent to the spool 8, and a narrow end 20 of the truncated body 18 is positioned adjacent to the hook 22. This arrangement hinders the leader line wrapped around the arm 17 from slipping past the arm 17. The free end 24 of the hook 22 is positioned offset from a lateral portion 21 of the truncated body 18 by a narrow gap 26 so that the main supply is easily accessible.

As shown in FIG. 3, the present invention further comprises a loop 32 and a stopping fastener 33. The loop 32 allows the present invention to be integrated into a fishing line. The stopping fastener 33 preferably defines the loop 32 and connects the loop 32 to the flexible wire 1. Furthermore, the stopping fastener 33 prevents any connected fishing accessories along the flexible wire 1 from slipping past the flexible wire 1. In order to secure fishing accessories along the flexible line, a proximal end 2 of the flexible wire 1 is positioned adjacent the cap 4 and the loop 32 is fixed to a distal end 3 of the flexible wire 1 by the stopping fastener 33. This arrangement allows a variety of fishing line accessories to freely traverse along the flexible wire 1 while be contained along the flexible wire 1.

Various embodiments of the present invention comprise fishing line accessories such as at least one ornament 34, a fishing bobber 35, and at least one weight 36, as illustrated in FIG. 1 and FIG. 2. The at least one ornament 34 visually attracts fish towards the present invention and, consequently, to bait attached to the leader line. The at least one ornament 34 is preferably reflective. The fishing bobber 35 increases the buoyancy of the present invention and the leader line. The fishing bobber 35 is preferably cork. The at least one weight 36 increases the weight of the present invention and the leader line such that the bait attached to the leader line is positioned at a desired distance from the surface level of the water. The at least one slideable ornament, the fishing bobber 35, and the weight are each engaged along the flexible wire 1.

Although the invention has been explained in relation to its preferred embodiment, it is to be understood that many other possible modifications and variations can be made without departing from the spirit and scope of the invention as hereinafter claimed.

What is claimed is:

1. A leader line spooling device comprises:
   a flexible wire;
   a cap;
   a spool;
   an eyelet hook;
   a fishing line hole;
   the eyelet hook comprises an arm and a hook;
   the cap being terminally connected to the flexible wire;
   the spool being connected adjacent to the cap, opposite the flexible wire;
   the spool being aligned with the cap along a central axis;
   the arm being connected adjacent to the spool, opposite the cap;
   the hook being connected adjacent to the arm, opposite the spool;
   the fishing line hole laterally traversing through the spool;
   a notch;
   the notch laterally traversing into the arm, along a concave surface of the eyelet hook;
   a sagittal plane bilaterally traversing through the spool and the eyelet hook;
   the notch being oriented at an acute angle with the sagittal plane of the spool; and
   the notch being positioned adjacent a free end of the hook.

2. The leader line spooling device as claimed in claim 1 comprises:
   the spool comprises a first stop, a second stop, and a cylindrical body;
   the first stop being terminally fixed to the cylindrical body;
   the second stop being terminally fixed to cylindrical body, opposite the first stop;
   the fishing line hole traversing through the cylindrical body;
   the first stop, the second stop, and the cylindrical body being aligned with the central axis;
   the first stop being positioned adjacent to the cap; and, the second stop being positioned adjacent to the arm.

3. The leader line spooling device as claimed in claim 2 comprises:
    a diameter of the first stop being larger than a diameter of the cylindrical body; and,
    a diameter of the second stop being larger than the diameter of the cylindrical body.

4. The leader line spooling device as claimed in claim 1 comprises:
    the cap comprises a main body, a first end, and a second end;
    the main body tapering from the first end to the second end; and,
    the first end being positioned adjacent the spool.

5. The leader line spooling device as claimed in claim 1 comprises:
    the arm being angularly aligned with the central axis; and,
    a diameter of the hook being smaller than a diameter of the spool.

6. The leader line spooling device as claimed in claim 1 comprises:
    the arm comprises a truncated body;
    a wide end of the truncated body being positioned adjacent to the spool;
    a narrow end of the truncated body being positioned adjacent to the hook; and,
    a free end of the hook being positioned offset from a lateral portion of the truncated body by a narrow gap.

7. The leader line spooling device as claimed in claim 1 comprises:
    a loop;
    a stopping fastener;
    a proximal end of the flexible wire being positioned adjacent the cap; and,
    the loop being fixed a distal end of the flexible wire by the stopping fastener.

8. The leader line spooling device as claimed in claim 1 comprises:
    at least one ornament; and,
    the at least one slideable ornament being slidably engaged along the flexible wire.

9. The leader line spooling device as claimed in claim 1 comprises:
    a fishing bobber; and,
    the fishing bobber being slidably engaged along the flexible wire.

10. The leader line spooling device as claimed in claim 1 comprises:
    at least one weight; and,
    the weight being slidably engaged along the flexible wire.

11. A leader line spooling device comprises:
    a flexible wire;
    a cap;
    a spool;
    an eyelet hook;
    a fishing line hole;
    a loop;
    a stopping fastener;
    a notch;
    the eyelet hook comprises an arm and a hook;
    the cap being terminally connected to the flexible wire;
    the spool being connected adjacent to the cap, opposite the flexible wire;
    the spool being aligned with the cap along a central axis;
    the arm being connected adjacent to the spool, opposite the cap;
    the hook being connected adjacent to the arm, opposite the spool;
    the fishing line hole laterally traversing through the spool;
    a proximal end of the flexible wire being positioned adjacent the cap;
    the loop being fixed a distal end of the flexible wire by the stopping fastener;
    the notch laterally traversing into the arm, along a concave surface of the eyelet hook;
    a sagittal plane bilaterally traversing through the spool and the eyelet hook;
    the notch being oriented at an acute angle with the sagittal plane of the spool;
    and,
    the notch being positioned adjacent a free end of the hook.

12. The leader line spooling device as claimed in claim 11 comprises:
    the spool comprises a first stop, a second stop, and a cylindrical body;
    the first stop being terminally fixed to the cylindrical body;
    the second stop being terminally fixed to cylindrical body, opposite the first stop;
    the fishing line hole traversing through the cylindrical body;
    the first stop, the second stop, and the cylindrical body being aligned with the central axis;
    the first stop being positioned adjacent to the cap; and,
    the second stop being positioned adjacent to the arm.

13. The leader line spooling device as claimed in claim 12 comprises:
    a diameter of the first stop being larger than a diameter of the cylindrical body; and,
    a diameter of the second stop being larger than the diameter of the cylindrical body.

14. The leader line spooling device as claimed in claim 11 comprises:
    the cap comprises a main body, a first end, and a second end;
    the main body tapering from the first end to the second end; and,
    the first end being positioned adjacent the spool.

15. The leader line spooling device as claimed in claim 11 comprises:
    the arm being angularly aligned with the central axis; and,
    a diameter of the hook being smaller than a diameter of the spool.

16. The leader line spooling device as claimed in claim 11 comprises:
    the arm comprises a truncated body;
    a wide end of the truncated body being positioned adjacent to the spool;
    a narrow end of the truncated body being positioned adjacent to the hook; and,
    a free end of the hook being positioned offset from a lateral portion of the truncated body by a narrow gap.

17. The leader line spooling device as claimed in claim 11 comprises:
    at least one ornament; and,
    the at least one slideable ornament being slidably engaged along the flexible wire.

18. The leader line spooling device as claimed in claim 11 comprises:
    a fishing bobber; and,
    the fishing bobber being slidably engaged along the flexible wire.

19. The leader line spooling device as claimed in claim 11 comprises:
   at least one weight; and,
   the weight being slidably engaged along the flexible wire.

* * * * *